United States Patent [19]

Dodson

[11] Patent Number: 4,702,154

[45] Date of Patent: Oct. 27, 1987

[54] COOLING SYSTEM FOR PERSONAL COMPUTER

[76] Inventor: Douglas A. Dodson, 31510 Mountain Way, Bonsall, Calif. 92003

[21] Appl. No.: 7,488

[22] Filed: Jan. 28, 1987

[51] Int. Cl.[4] .............................................. H05K 7/20
[52] U.S. Cl. ........................................ 98/1; 165/122; 361/384
[58] Field of Search ............... 98/1, 115.3; 174/16 R; 165/122; 361/384

[56] References Cited

U.S. PATENT DOCUMENTS

| | | | |
|---|---|---|---|
| 2,897,487 | 7/1959 | Owen | 174/16 R X |
| 4,084,250 | 4/1978 | Albertine et al. | 361/384 X |
| 4,356,531 | 10/1982 | Marino et al. | 361/384 |

FOREIGN PATENT DOCUMENTS 2235564  1/1974  Fed. Rep. of Germany ............ 98/1

OTHER PUBLICATIONS

Jim Forney, "Turbo-Cool: Keeping Your PC from Overboiling", *PC Magazine*, Copyright 1986.

Turbo-Cool TM 150/200 PC/XT Power Supply, PC Cooling Systems, Bonsall, Ca.

*Primary Examiner*—Harold Joyce
*Attorney, Agent, or Firm*—Duane C. Bowen

[57] ABSTRACT

A retrofit power supply/fan unit for IBM PC and XT personal computers achieving lower operating temperatures. The unit is contained in a sub-housing positioned in a rear upper corner of the computer housing. The sub-housing has a rear exhaust opening and the computer housing has generally oppositely disposed air inlet openings. The sub-housing has a top wall with its uppermost portion spaced from the underside of the top of the computer housing about ⅜" and the top wall of the sub-housing having a forward sloping top wall portion downwardly sloping at an angle of about 10° to the horizontal as it extends forwardly to facilitate air flow thereto. A pair of juxtaposed fan openings disposed in the forward sloping top wall portion and a pair of fans in the sub-housing aligned with the juxtaposed fan openings to draw air through the sub-housing, each fan being rated at about 32 cfm.

4 Claims, 9 Drawing Figures

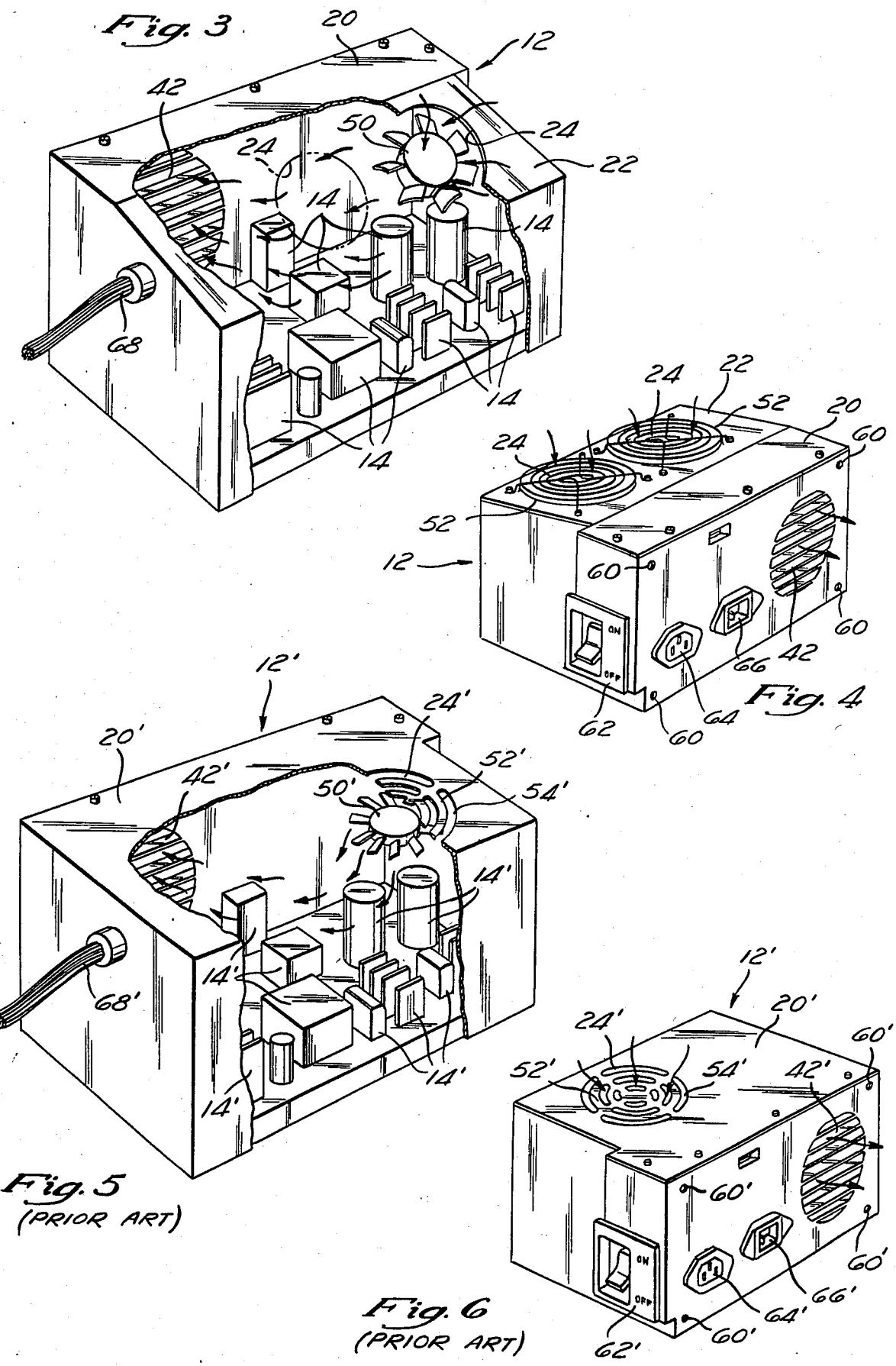

COOLING SYSTEM FOR PERSONAL COMPUTER

BRIEF SUMMARY OF THE INVENTION

BACKGROUND AND OBJECTIVES

My invention relates to improvements in the cooling of personal computers, particularly IBM PC and XT personal computers.

If internal operating temperatures in a personal computer are excessive, lives of computer components are shortened, computer reliability is reduced, and further expansion of functions is limited. I discovered the IBM PC and XT computers were suffering excessive operating temperatures, i.e., as high as about 130°, (when ambient temperatures were around 77°). This has occurred apparently because the designers of these computers did not anticipate the levels of additions of heat producing modifications to the computers. Such additions have occurred largely in expansion cards, which are more numerous and which are more heat producing than may have been anticipated, due to the trend to perform more functions with personal computers and due to the trend to concentrate more electronic functions per unit space of expansion cards. Such expansion cards include hardcards, in color graphics board, in multifunction board, in accelerator board, etc. In other words, the computer designers apparently did not fully anticipate the high densities of power hungry components that would be packed in the expansion cards. Electronic chips get hotter with increased sophistication and higher speeds. It is possible the designers thought mostly about the use of the computer fan to cool only the power supply, located together in a sub-housing within the computer housing, and did not consider the other components then contemplated, such as expansion cards, that would need forced air cooling in addition to natural convection from air inlet and outlet ports and from other openings permitting ambient air inlet and outlet.

I not only discovered that temperatures in these computers were excessive but I also conceived the idea that it might be possible to achieve the needed additional cooling within the pre-existing, normal computer housing and within the space limits provided before for a power unit and fan sub-housing, and without change of internal power supply components or change of external features such as power supply receptacles and on-off switch. I conceived of measures, within such tight sub-housing limitations, to increase fan cooling capacities to the needed level, i.e., to decrease operating temperatures within the IBM PC and XT computers to the level of about 102°, assuming ambient temperatures are around 77°, for examples. It will be understood that the problem of overheating of a personal computer can be intensified during summer weather with elevated ambient temperatures, unless ambient temperatures are strictly limited by ample airconditioning. Excessive heat can cause strange things to happen in a computer, as well as causing shortening of the lifespan of expensive plug-in boards, etc., that have been added to the system.

The objectives of my invention include: to provide an improved cooling system for personal computers, particularly IBM PC and XT personal computers; to reduce the level of internal temperatures in such computers for longer component life, greater expandability and better reliability; to decrease air intake restrictions between inlet to the computer and outlet from the computer and to reduce existing back pressures limiting air flow through the computer; to provide for retrofitting personal computers with my new sub-housing, incorporating the power supply and fan means, without requiring modification to computer housing and to its other contents and air inlets and outlets, i.e., to be able to install merely be removing the screws securing the old power supply/fan sub-housing and installing my new power supply/fan sub-housing with the same screws; and to improve air circulation with a new power supply/fan sub-housing fitting within the same space envelope as the old power supply/fan sub-housing.

My invention will be best understood, together with additional advantages and objectives thereof, when read with reference to the drawings.

DRAWINGS

FIG. 1 is a perspective view of an improved cooling system for a personal computer showing a specific embodiment of my invention. Portions of the computer housing are broken away to better show the invention. Air flow is indicated by arrows.

FIG. 2 is like FIG. 1 but shows a prior art cooling system used in IBM PC and XT personal computers.

FIG. 3 is a perspective view of a power supply and fan unit which is part of the specific embodiment of my invention. Portions of the unit housing are broken away to better show the invention. Air flow is indicated by arrows.

FIG. 4 is generally like FIG. 3 but views an opposite corner of the unit housing.

FIG. 5 is like FIG. 3 but shows a prior art power supply and fan unit used in IBM PC and XT personal computers.

FIG. 6 is like FIG. 4 but shows a prior art power supply and fan unit used in IMB PC and XT personal computers.

Figure 9:
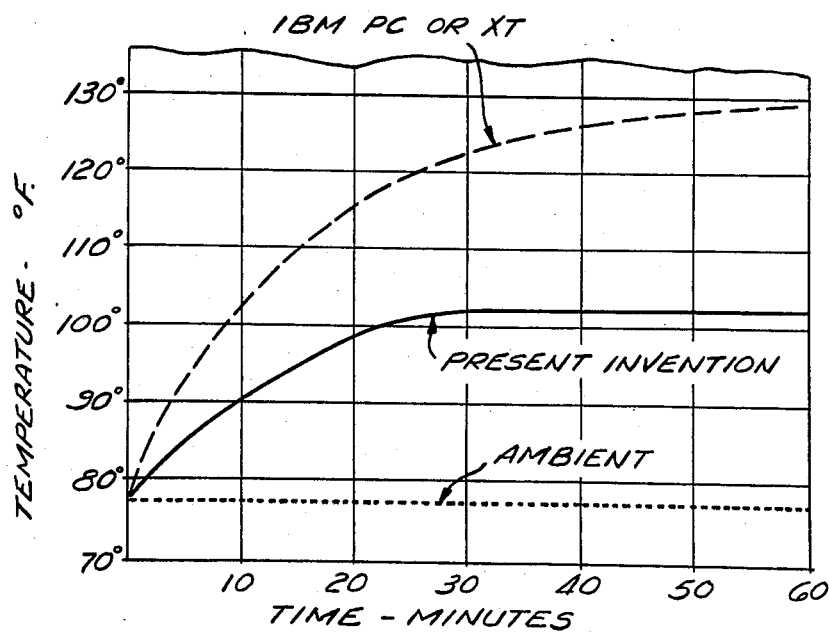

FIG. 9 is a graph comparing my invention with the prior art. The y-axis is in degrees Fahrenheitand the x-axis is time in minutes. The full line represents my invention and the dashed line represents the prior art. The dotted line is ambient temperature.

SPECIFIC DESCRIPTION

Figure 1:
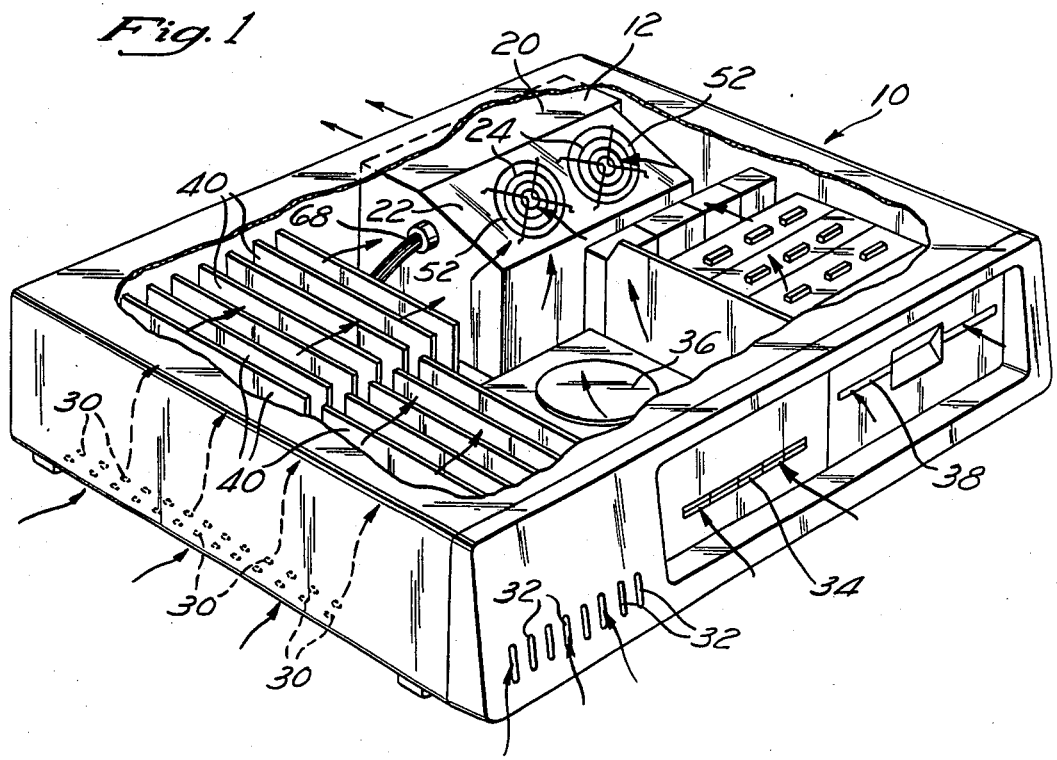
Figure 2:
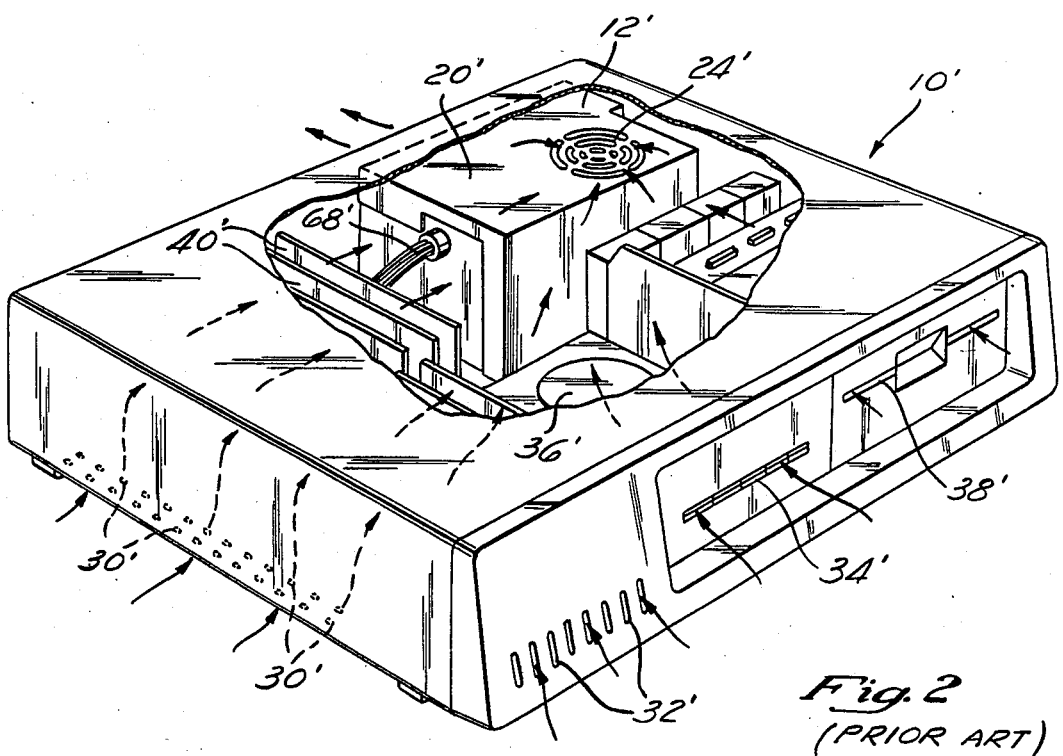

The personal computers 10, 10' shown in FIGS. 1 and 2 are identical except for having different power supply and fan units 12, 12'. The personal computers shown represent IBM PC and XT personal computers.

The power supply and fan unit 12' shown represents the unit in these IBM computers when sold. My new unit 12 is shown to be the same as unit 12' except for changes in the unit housings and changes in fans. Actually the units 12 that I manufacture also modify some components 14, 14' of the power supply but that is not part of this present invention. In any case, interference by components 14, 14' with air flow within the housings of unit 12 and unit 12' is about tha same, as depicted.

My unit 12 fits within the same maximum space envelope as the prior unit 12', i.e., the dimensions of units 12, 12' in plan view can be the same, their dimensions in rear elevational view can be the same, and the maximum heights of the units 12, 12' in elevational views can be the same. There is the same minimum spacing between the tops of units 12, 12' and the undersides 16, 16' of the top walls of computers 10, 10'. That minimum spacing is about ⅜"±1/16" and I do not intend to change that spacing.

What I do change in the housings of units 12, 12' concerns (a) providing unit 12 with an uppermost portion 20, at the rear, disposed horizontally and having the same minimum spacing from the underside 16 of the top wall of computer 10 (⅜"±1/16") as in IBM PC and XT original manufacture, and (b) providing a forward sloping top wall portion 22 downwardly, forwardly sloping from portion 20 at an angle of about 10° to the horizontal to facilitate air flow to a pair of fan openings 24.

The prior unit 12' had a top wall 20' disposed completely horizontally and spaced about ⅜"±1/16" from the underside 16' of the top wall of computer 10' and had a single fan opening 24'.

Air enters the housings of computers 10, 10' through bottom openings 30, 30', through front openings 32, 32', through slots 34, 34' to the area of storage discs 36, 36' and also to the area hard drives if they are used, and through the slot 38, 38' used to insert floppy discs. Openings 30, 30', 32, 32' are in the area of expansion cards 40, 40'.

Flow of air from openings 30', 32', 34', 38' to fan opening 24' has more impediments than flow of air from openings 30, 32, 34, 38 to fan openings 24. Sloping wall 22 is more directed at the approaching air stream than top wall 22', i.e., the axis of fan opening 24' could be said to be generally 90° to the direction of flow of approaching air whereas the axes of twin fan openings 24 could be said to be generally 80° to the direction of flow. Thus the air stream to opening 24' turns about 90° whereas the air stream to opening 24 turns about 80°. More importantly the front "window" between top wall 20' and housing top undersurface 16' facing the air stream is ⅜"±1/16" in height in the prior art configuration, whereas the front "window" between the forward edge of sloping wall 22 and housing top undersurface 16 facing the air stream is about 1⅜"±3/32", for an increased "window" height of about 120%. Further, to an extent air funnels to fan openings 24 between converging walls 16, 22 whereas air faces a right angle corner at the front of unit 12' in compressing to pass between walls 16', 22'. It will be understood that all of the foregoing factors impede delivery of air to fan opening 24' as compared to delivery of air to fan openings 24. Such impediments to flow through a fan are sometimes termed "back pressure", i.e., narrower passageways, 90° turns, etc., increase back pressure of fans. Abruptness of transistions in air flow areas and higher degrees of turning of air flow both increase back pressures. The less the volume of air flow through fan openings 24, 24' per unit time (cfm), the less cooling of computers 10, 10' occurs.

The addition of hard drives above storage discs 36, 36' and the addition of more expansion cards 40, 40' both restrict air flow through computers 10, 10' and constitute additional sources of back pressure to the fan or fans. They are also sources of additional heat.

Figure 7:
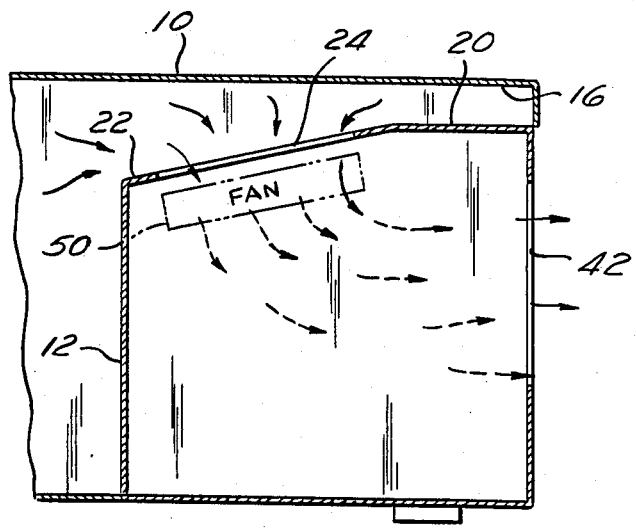
FIG. 7 is an elevational view, partly in section, taken, according to my invention, through the computer in the area of the power supply and fan unit.
Figure 8:
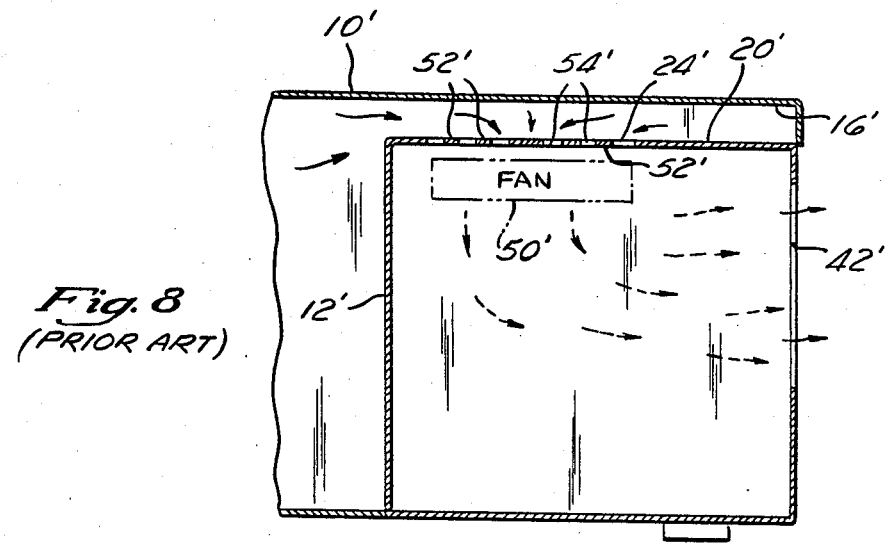
FIG. 8 is a view like FIG. 7 but shows a prior art power supply and fan unit used in IBM PC and XT personal computers.

FIGS. 7 and 8 also show the more abrupt turning of air flow between the prior art opening 24' and air exit opening 42' in unit 12', as compared to air flow between my air openings 24 and air exit opening 42 in unit 12. As units 12, 12' have various power system components 14, 14', flow between openings 24, 24' and openings 42, 42' also have these obstructions to free flow. As I use twin fans, one fan opening 24 is in the same end of housing 12 as air exit opening 42, whereas all air flow between air opening 24' to air exit opening 42' has to pass longitudinally of housing 12' and components 14' as well as transversely.

As I have two fan openings 24 in housing 12, this further reduces back pressure as compared with the single fan opening 24' which has approximately 50% of the combined area of openings 24.

Another primary factor in cooling of computers 10, 10' is the fact I use two fans 50 combining to afford approximately twice the amount of fan capacity compared with the single fan 50' provided as original equipment in the IBM PC and XT computers. I utilize wire grills 52 secured above fan openings 24, whereas in the prior art opening 24' the equivalent of wire grills is provided by forming air opening 24' as a series of arcuate, concentric slots, which provide a lesser "window" in air opening 24' as compared with either air opening 24, because of the material 52' between the slots 54'.

The IBM fan 50' is rated 32 cfm and actually delivers 11 cfm. Each of my fans is rated 32 cfm and delivers 12 cfm. Therefore, the prior art fan 50' delivers 11 cfm and my fans 50 combine to deliver 24 cfm. This is an increase of 118% in cfm of fan delivery in my invention.

The fans 50' provided by IBM in orginal manufacture are 1¼" to 1½" in vertical thickness, whereas the fans 50 I utilize are 1" in thickness. This helps compensate for the fact that sloping wall 22 tends to position fan 50 closer to components 14 than was the case in the IBM configuration.

Four screws extending through the computer housing into four threaded openings 60' to secure IBM unit 12' in place in computer 10'. I provide four matching threaded openings 60 to secure my unit 12 in place in computer 10, so units 12, 12' can be readily innterchanged. The external aspects of units 10 and 10' are substantially identical, i.e., on-off switch fitting 62, 62', receptacles 64, 64' plugs 66, 66' and electrical conductors 68, 68' to other components in computers 10, 10'. The housings of computers 10, 10' have openings to clear exhaust openings 42, 42', switch housings 62, 62', receptacles 64, 64', plugs 66, 66', etc.

FIG. 9 is a graph showing an example of the improved results I obtain with my new computer cooling system. Temperatures are measured with temperature probes located in a plane between two expansion cards 40, 40' and ¼" below the underside 16, 16' of the top walls of computers 10, 10'. With an ambient temperature of about 77°, the measured temperature within the housing of computer 10 using my new power supply and fan unit 12 leveled off by 60 minutes at about 102°. The measured temperature within the housing of computer 10' with original manufacture IBM PC or XT power supply and fan unit 12' was at about 129° at 60 minutes and was still on a somewhat rising slope. This 27° differential in temperature means that my computer components will have longer lives and reliability of operations is increased, as compared with IBM PC and XT computers 10' using prior OEM power supply and fan units 12'. Also, my cooling system would permit more expansion of functions than the prior art cooling system, from the viewpoint of limiting operating temperatures.

Having thus described my invention, I do not wish to be understood as limiting myself for the exact construction shown and described. Instead, I wish to cover those modifications of my invention that will occur to those skilled in the art upon learning of my invention and which are within the proper scope thereof.

I claim:

1. A power supply and fan unit for IBM PC and XT personal computers, comprising:
   (a) each personal computer having a computer housing formed of sheet material and having disposed inside said computer housing in a rear upper corner a power supply and fan unit housing,
   (b) said unit housing having a rear wall and having an air exhaust opening in said rear wall, and said computer housing having air inlet means to admit ambient air to said computer housing disposed generally oppositely to the location of said unit housing,
   (c) said unit housing having a top wall with its uppermost portion spaced from the underside of the top of said computer housing about ⅝" and said top wall of said unit housing having a forward sloping top wall portion downwardly sloping at an angle of about 10° to the horizontal as it extends forwardly to facilitate air flow thereto and a pair of juxtaposed fan openings disposed in said forward sloping top wall portion and a pair of fans in said unit housing aligned with said juxtaposed fan openings to draw air therefrom and to exhaust through said air exhaust opening in said unit housing, each fan being rated at about 32 cfm.

2. A power supply and fan unit for IBM PC and XT personal computers, comprising:
   (a) each personal computer having a computer housing formed of sheet material and having disposed inside said computer housing in a rear upper corner a power supply and fan unit housing,
   (b) said unit housing having a rear wall and having an air exhaust opening in said rear wall, and said computer housing having air inlet means to admit ambient air to said computer housing disposed generally oppositely to the location of said unit housing,
   (c) said unit housing having a top wall with its uppermost portion spaced from the underside of the top of said computer housing and said top wall of said unit housing having a forward sloping top wall portion downwardly sloping as it extends forwardly to facilitate air flow thereto and a pair of juxtaposed fan openings disposed in said forward sloping top wall portion and a pair of fans in said unit housing aligned with said juxtaposed fan openings to draw air therefrom and to exhaust through said air exhaust opening in said unit housing.

3. a power supply and fan unit for personal computers, comprising:
   (a) each personal computer having a computer housing formed of sheet material and having disposed inside said computer housing in an upper rear location a power supply and fan unit housing,
   (b) said unit housing having an air exhaust opening, and said computer housing having air inlet means to admit ambient air to said computer housing disposed generally oppositely to the location of said unit housing,
   (c) said unit housing having a top wall with its uppermost portion spaced from the underside of the top of said computer housing and said top wall of said unit housing having a forward sloping top wall portion downwardly sloping as it extends forwardly to facilitate air flow thereto and a pair of juxtaposed fan openings disposed in said forward sloping top wall portion and a pair of fans in said unit housing aligned with said juxtaposed fan openings to draw air therefrom and to exhaust through said air exhaust opening in said unit housing.

4. A power supply and fan unit for personal computers, comprising:
   (a) each personal computer having a computer housing formed of sheet material and having disposed inside said computer housing in an upper location a power supply and fan unit housing,
   (b) said unit housing having an upright wall and having an air exhaust opening in said upright wall, and said computer housing having air inlet means spaced from said unit housing to admit ambient air to said computer housing,
   (c) said unit housing having a top wall with its uppermost portion spaced from the underside of the top of said computer housing and said top wall of said unit housing having a sloping top wall portion on its side toward said air inlet means downwardly sloping as it extends in the direction of said air inlet means to facilitate air flow thereto and a pair of juxtaposed fan openings disposed in said sloping top wall portion and a pair of fans in said unit housing aligned with said juxtaposed fan openings to draw air therefrom and to exhaust through said air exhaust opening in said unit housing.

* * * * *